L. M. TODD.
NEGOTIABLE INSTRUMENT.
APPLICATION FILED DEC. 17, 1903.
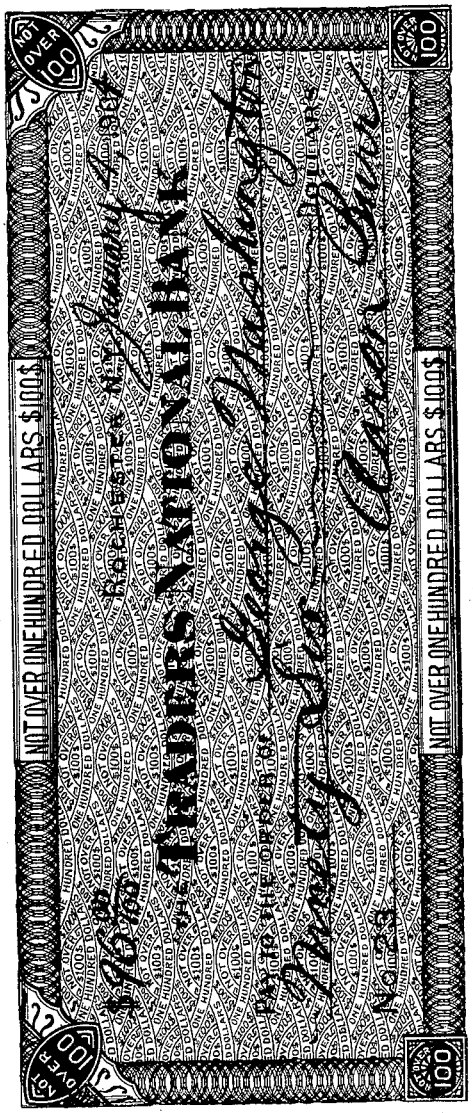

UNITED STATES PATENT OFFICE.

LIBANUS M. TODD, OF ROCHESTER, NEW YORK.

NEGOTIABLE INSTRUMENT.

980,365.      Specification of Letters Patent.      Patented Jan. 3, 1911.

Application filed December 17, 1903. Serial No. 185,517.

*To all whom it may concern:*

Be it known that I, LIBANUS M. TODD, of Rochester, in the county of Monroe and State of New York, have invented certain new and useful Improvements in Negotiable Instruments; and I do hereby declare the following to be a full, clear, and exact description of the same, reference being had to the accompanying drawings, forming a part of this specification, and to the reference-numerals marked thereon.

The object of my present invention is to provide a negotiable instrument such as a check, draft, bill of exchange, or the like that will bear upon its face such characters, designs or markings that will limit the amount for which the instrument is payable, and that will render fraudulent alteration practically impossible, all as will be hereinafter more fully explained and pointed out particularly in the claims hereunto annexed.

The present embodiment of my invention as illustrated in the accompanying drawing is shown applied to a check, the body portion of which contains the stipulated amount for which it is payable, the name of the payee and the signature of the payer or maker and the date, all of which are usually written or otherwise filled in, and place of payment and the number of the check and any other data that may be usually included in the body of the instrument. The face of the instrument containing the body portion of the check is, in the present instance, either partially or entirely covered with a suitable inscription or marking, such marking in the present embodiment of my invention comprising the words "Not over one hundred dollars" preferably arranged in the manner shown, that is, the words "Not over" are arranged in an arched curve, over the reversely curved wording "One hundred dollars", such an arrangement leaving a space between said words in which may be inserted the same amount in figures, the amount in the present instance being written $100$, curved parallel lines being also preferably arranged above and below the words thus arranged. The entire surface preferably of the instrument is covered by such designs or markings in such manner as to form a subordinate background for the body of the instrument, which also fills the blank spaces in which the name of the party to whom the instrument is made payable, the amount, and the signature of the maker are to be written, and as the limiting amount may be engraved, printed or otherwise marked a great number of times upon the face of the instrument by employing comparatively fine print or characters it will be obvious that any subsequent alteration that may be fraudulently made in the body of the instrument may be readily detected, and as the limiting amount repetitiously indicated in the marking on the face of the instrument determines the maximum or highest amount for which the instrument is payable, any alteration that may be attempted for the purpose of raising the stipulated amount for which the instrument is payable will be rendered unsuccessful for the reason that such a procedure would necessitate the alteration of the amount stipulated in every limiting mark, otherwise the instrument would be void and not payable above the limiting amount.

As an additional precaution, I employ in the present embodiment, a border that preferably surrounds the edges of the instrument, and which is provided at its corners with additional limiting or counter marks, the marking adopted in the present instance embodying the marks and figures "Not over 100" arranged in any suitable manner preferably within an ornamental space. These counter-marks at the corners of the border preferably extend inwardly into the body of the instrument, so that should the remaining portion of the border be clipped off or otherwise removed from the body portion, a portion of the counter-mark showing the limiting amount of the instrument will remain on the body portion thereof. In addition to the counter-marks, the limiting amount may be marked in the border by the words "Not over one hundred dollars $100$", or some equivalent marking, the remaining portion of the border being embellished by scroll work or any desirable ornamentation.

In employing checks, drafts, bills of exchange and other commercial paper that embody my invention, an instrument is selected whose limiting amount equals, or most nearly approximates but is greater than the amount for which the instrument is to be made payable in order that the difference between the amount stipulated in writing in the body of the instrument and that of the limiting amount will be practically insignificant, thereby reducing the liability of fraudulent alteration to a minimum.

I claim as my invention:—

1. A blank instrument the body of which is partially filled in and provided with a space therein which is to be filled in to complete the instrument, having a background provided with designating characters which limit the highest amount for which the instrument may be drawn, said characters substantially covering the entire face of the instrument, and provided with a border having a plurality of characters also limiting the highest amount for which said instrument may be drawn, some of said border characters being so disposed as to extend from the border into the body of the instrument.

2. A blank instrument the body of which is partially filled in and provided with a space therein which is to be filled in to complete the instrument, having a background provided with designating characters which limit the highest amount for which the instrument may be drawn, said back-ground characters being arranged to cover substantially the entire face of the instrument, and provided with a border distinguished from the body of the instrument having two sets of limiting marks of the same denomination as those on the face of the instrument, one arranged entirely in the border and the other set being located at the corners of the instrument and arranged partly within the border and extending therefrom into the body of the instrument.

3. A blank instrument the body of which is partially filled in and provided with a blank space which is to be filled into complete the instrument, and a background provided with designating characters which limit the highest amount for which the instrument may be made payable and arranged to cover the face of the instrument.

4. A blank instrument the body of which is partially filled in and having a space therein which is to be filled in to complete the instrument, and a background imprinted to cover the face of the instrument and composed of designating characters which limit the highest amount for which the instrument is payable.

5. A blank instrument the body of which is partially filled in and having a space which is to be filled in to complete the instrument, and a background provided on the face of the instrument subordinate to the body of the instrument, said background being composed of characters which limit the highest amount for which the instrument may be made payable.

6. A blank instrument the body of which is partially filled in and having a space which is to be filled in to complete the instrument, and a background on the face of the instrument provided with a plurality of designs containing characters which limit the highest amount for which the instrument may be made payable.

7. A blank instrument the body of which is partially filled in, a space being provided therein which is to be filled in to complete the body of the instrument, and a background imprinted on the instrument blank consisting of repetitious markings which denominate the limit of the highest amount for which the instrument may be made payable.

8. A blank instrument the body of which is partially filled in, a space being provided therein to receive the name of the payee, and a limiting amount repetitiously marked on the face of the instrument in the space where the name of the payee is to be filled in.

9. A blank instrument the body of which is partially filled in, a space being provided therein to receive the stipulated amount for which the instrument is made payable, and a limiting amount repetitiously marked on the instrument in the space in the body of the instrument to receive the stipulated amount.

10. A blank instrument the body of which is partially filled in, spaces being provided therein for the name of the payee, the stipulated amount and the signature of the payer to complete the body of the instrument, and limiting marks repetitiously marked on the instrument in the spaces which are provided in the body thereof.

LIBANUS M. TODD.

Witnesses:
CLARENCE A. BATEMAN,
RUSSELL B. GRIFFITH.